United States Patent
Patel et al.

(10) Patent No.: US 9,231,971 B2
(45) Date of Patent: Jan. 5, 2016

(54) PROTECTING A USER FROM A COMPROMISED WEB RESOURCE

(71) Applicant: F-Secure Corporation, Helsinki (FI)

(72) Inventors: Andrew Patel, Helsinki (FI); Igor Afanasiev, Helsinki (FI); Veli-Jussi Kesti, Espoo (FI); Urmas Rahu, Espoo (FI); Yury Yakovlev, Espoo (FI); Jarkko Konola, Oulu (FI); Janne Pirttilahti, Helsinki (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 14/070,903

(22) Filed: Nov. 4, 2013

(65) Prior Publication Data

US 2014/0130165 A1    May 8, 2014

(30) Foreign Application Priority Data

Nov. 8, 2012   (GB) .................................. 1220146.3

(51) Int. Cl.
| | | |
|---|---|---|
| *G06F 21/55* | (2013.01) | |
| *G06F 21/51* | (2013.01) | |
| *H04L 29/06* | (2006.01) | |
| *G06F 21/50* | (2013.01) | |

(52) U.S. Cl.
CPC ............ *H04L 63/1441* (2013.01); *G06F 21/50* (2013.01); *G06F 21/51* (2013.01); *G06F 21/55* (2013.01); *H04L 63/1425* (2013.01); *G06F 2221/2119* (2013.01)

(58) Field of Classification Search
CPC .................................................. H04L 63/1441
See application file for complete search history.

(56) References Cited

U.S. PATENT DOCUMENTS

| | | | |
|---|---|---|---|
| 8,667,587 B1 * | 3/2014 | Bogorad et al. ................ 726/22 |
| 8,689,341 B1 * | 4/2014 | Hartmann et al. .............. 726/26 |
| 2003/0097591 A1 | 5/2003 | Pham et al. .................... 713/201 |
| 2006/0253581 A1 * | 11/2006 | Dixon et al. ................... 709/225 |
| 2007/0250817 A1 * | 10/2007 | Boney ............................ 717/124 |
| 2008/0082662 A1 * | 4/2008 | Dandliker et al. ............. 709/225 |
| 2012/0102545 A1 | 4/2012 | Carter, III et al. ................ 726/3 |

FOREIGN PATENT DOCUMENTS

KR    2010 0022281 A    3/2010

OTHER PUBLICATIONS

Grzelak, "Sources" https://shouldichangemypassword.com/sources, Oct. 2011.*
www.pwnedlist.com, 10 pgs., Internet web site, Nov. 4, 2013.
www.zone-h.org, 2 pgs., Internet web site, Oct. 28, 2013.

* cited by examiner

*Primary Examiner* — Tae Kim
*Assistant Examiner* — Louis Teng
(74) *Attorney, Agent, or Firm* — Harrington & Smith (57) ABSTRACT

According to an aspect of the invention, there is provided a method of protecting a user from a compromised web resource. The method may include monitoring a user's requests for trusted web resources to determine one or more web resources to be checked. The method may include querying a network database based on the determined one or more web resources to obtain historical data relating to whether any of the one or more web resources has been compromised at any time during a preceding time period. The method may include providing a predetermined response to protect the user if any of the one or more web resources has been compromised.

21 Claims, 4 Drawing Sheets

PROTECTING A USER FROM A COMPROMISED WEB RESOURCE

TECHNICAL FIELD

The invention relates to, but is not limited to, methods and apparatus for protecting a user from a compromised web resource. The invention relates to, but is not limited to, methods and apparatus for determining whether a web resource has been compromised.

BACKGROUND

There are a variety of online web-based services that require a user to create an individual login account in order to access the online service and to provide a level of security to information held by the provider of the service. These online services might include, for example, web-based email sites, chat forums, online payment sites, web stores, social networking sites and media sites, as well as many other online services.

Recently, attacks against such sites have become more commonplace. In many cases, attackers have been able to steal user login information, such as user account details, passwords and even credit card numbers.

In high-profile cases, the news of such attacks may be broadcast by news stations and stories may be carried in newspapers and on news websites. However, this may not always be the case and it is difficult for users to be aware of which web resources have been attacked and/or compromised.

SUMMARY

According to an aspect of the invention, there is provided a method of protecting a user from a compromised web resource. The method may comprise monitoring a user's requests for web resources over a period of time to determine a set of web resources used and trusted by the user. The method may comprise querying a database based on the determined one or more web resources to obtain historical data relating to whether any of the one or more web resources has been compromised at any time during a preceding time period. The method may comprise restricting access to a requested web resource of the set of web resources if the requested web resource has been compromised.

Optionally, the database may be a network database.

Optionally, the user's request that are monitored are requests for trusted web resources.

Optionally, the database comprises data relating to whether one or more known clean web resources have been compromised.

Optionally, the method may further comprise maintaining the database by polling a plurality of network sources to compile data relating to whether a web resource has been compromised at any time during a preceding time period. One or more of the network resources may be polled daily.

Optionally, the user's requests for web resources are monitored for one or more days.

Optionally, monitoring a user's requests for web resources comprises reading data from a stored history of a user's requests for web resources to determine a set of web resources used and trusted by a user.

Optionally, reading data from a stored history comprises reading information relating to one or more of: base domain names of a web resource requested; a time that a web resource has been requested; the HTTP method used to request a web resource; and whether a user has uploaded any data to a server associated with a web resource.

Optionally, monitoring a user's requests for web resources further comprises one or more of: determining the number of times a user requests a web resource over a time period; and determining whether a user has requested a web resource within a specified preceding time period.

Optionally, determining the set of web resources comprises adding a web resource to the set if the frequency of requests for the web resource is greater then a predetermined threshold.

Optionally, determining the set of web resources comprises adding a web resource to the set if the user has requested the web resource within a specified preceding time period.

Optionally, determining the set of web resources comprises adding a web resource to the set if the user has uploaded data to the web resource within a specified preceding time period.

Optionally, the database is queried periodically to obtain data relating to whether one or more of the web resources in the set of web resources has been compromised.

Optionally, monitoring a user's requests for web resources comprises intercepting a request for a web resource.

Optionally, monitoring a user's requests for web resources further comprises normalising and parsing the user request for determining a base domain name for a requested web resource.

Optionally, the one or more web resources to be checked comprises the web resource of the intercepted request.

Optionally, monitoring a user's requests for web resources comprises storing information relating to one or more of: base domain names of a web resource requested; a time that a web resource has been requested; the HTTP method used to request a web resource; and whether a user has uploaded any data to a server associated with a web resource.

Optionally, the data obtained from the database comprises the identity of a compromised web resource and meta data corresponding to a compromise of the web resource.

Optionally, the meta data comprises one or more of: whether account names were compromised; whether passwords were compromised; whether credit card numbers were compromised; and a time when the compromise occurred.

Optionally, providing a predetermined response comprises alerting a user that one or more web resources has been compromised.

Optionally, the alert comprises information of a time at which the compromise occurred and/or a recommended action for the user or the system administrator to take.

Optionally, the alert comprises one or more of: an on-screen pop-up and an email message.

Optionally, querying the database comprises checking historical data stored on the database and determining whether a web resource has been compromised, irrespective of the current compromised status of the web resource.

Optionally, the user requests for web resources are made by a user device, the method further comprising storing the data obtained from the database at the user device.

Optionally, the method further comprises, if a user requests a web resource, checking the stored data to determine whether the web resource has been compromised.

Optionally, monitoring a user's requests for web resources is carried out by a processor of a user device and/or a server.

Optionally, determining the set of web resources is carried out by a processor of a user device and/or a server.

Optionally, querying the network database comprises a processor of a user device transmitting the query to the network database over a network and/or a processor of a server querying a local or a network database.

Optionally, obtaining data relating to whether one or more web resources has been compromised comprises a processor associated with the database transmitting data retrieved from the database in accordance with the query to a user device over a network.

According to an aspect of the invention, there is provided a computer device configured to carry out a method according to any preceding claim.

According to an aspect of the invention, there is provided a non-transitory computer readable medium comprising computer readable code configured when read by a computer to undertake the method of any preceding claim.

According to an aspect of the invention, there is provided a device for protecting a user from a compromised web resource. The device may comprise a processor configured to monitor a user's requests for web resources over a period of time to determine a set of web resources used and trusted by the user. The processor may be configured to query a database to obtain historical data relating to whether the one or more web resources has been compromised at any time during a preceding time period. The processor may be configured to restrict access to a requested web resource of the set of web resources if the requested web resource has been compromised.

According to an aspect of the invention, there is provided a system for protecting a user from a compromised web resource. The system may comprise a processor and a network database. The processor may be configured to monitor a user's requests for web resources over a period of time to determine a set of web resources used and trusted by the user. The processor may be configured to query a database to obtain historical data relating to whether the one or more web resources has been compromised at any time during a preceding time period. The database may be configured to receive the query and provide data to the processor in accordance with the query. The processor may be further configured to restrict access to a requested web resource of the set of web resources if the requested web resource has been comprised.

According to an aspect of the invention, there is provided a server for protecting a user from a compromised web resource. The server may comprise a processor configured to monitor a user's requests for web resources over a period of time to determine a set of web resources used and trusted by the user. The processor may be configured to query a database to obtain historical data relating to whether the one or more web resources has been compromised at any time during a preceding time period. The processor may be configured to restrict access to a requested web resource of the set of web resources if the requested web resource has been compromised.

Also disclosed herein is a method of protecting a user from a compromised web resource, the method comprising: monitoring over a period of time a user's requests for web resources to determine a set of web resources used and trusted by the user; periodically querying a network database to obtain data relating to whether one or more of the web resources in the set has been compromised; and alerting the user or a system administrator if one or more of the web resource in the set has been compromised.

Also disclosed herein is a device for protecting a user from a compromised web resource, the device comprising a processor configured to: monitor over a period of time a user's requests for web resources to determine a set of web resources used and trusted by the user; periodically query a network database to obtain data relating to whether one or more of the web resources in the set has been compromised; and restrict alert the user or a system administrator if the web resource has been compromised.

Also disclosed herein is a system for protecting a user from a compromised web resource, the system comprising a processor and a network database: the processor being configured to: monitor over a period of time a user's requests for web resources to determine a set of web resources used and trusted by the user, and periodically request from the network database data relating to whether one or more of the web resources in the set has been compromised; and the database being configured to: receive the query and provide data to the processor in accordance with the query; the processor further configured to alert the user or a system administrator if the web resource has been compromised.

Also disclosed herein is a method of protecting a user from a compromised web resource, the method comprising: intercepting a user's request for a trusted web resource; querying a network database to obtain historical data relating to whether the requested web resource has been compromised at any time during a specified preceding time period; and alerting the user or a system administrator and/or restricting access to the requested web resource if the requested web resource has been compromised.

Also disclosed herein is a device for protecting a user from a compromised web resource, the device comprising a processor configured to: intercept a user's request for a trusted web resource; query a network database to obtain historical data relating to whether the web resource has been compromised at any time during a specified preceding time period; and alert the user or a system administrator and/or restrict access to the requested web resource if the requested web resource has been compromised.

Also disclosed herein is a system for protecting a user from a compromised web resource, the system comprising a processor and a network database: the processor being configured to: intercept a user's request for a trusted web resource; query a network database to obtain historical data relating to whether the web resource has been compromised at any time during a specified preceding time period; and the database being configured to: receive the query and provide data to the processor in accordance with the query; the processor further configured to alert the user or a system administrator and/or restrict access to the requested web resource if the requested web resource has been compromised.

Also disclosed herein is a method of protecting a user from a compromised web resource, the method comprising: reading data from a stored history of a user's requests for web resources to determine a set of web resources used and trusted by a user; querying a network database to obtain data relating to whether one or more of the web resources in the set of web resources has been compromised; and alerting the user or a system administrator if one or more of the web resources in the set of web resources has been compromised.

Also disclosed herein is a device for protecting a user from a compromised web resource, the device comprising a processor configured to: read data from a stored history of a user's requests for web resources to determine a set of web resources used and trusted by a user; query a network database to obtain data relating to whether one or more of the web resources in the set of web resources has been compromised; and alert the user or a system administrator if one or more of the web resources in the set of web resources has been compromised.

Also disclosed herein is a system for protecting a user from a compromised web resource, the system comprising a processor and a network database: the processor being configured to: read data from a stored history of a user's requests for web resources to determine a set of web resources used and trusted by a user; query a network database to obtain data relating to whether one or more of the web resources in the set of web resources has been compromised; and the database being configured to: receive the query and provide data to the processor in accordance with the query; the processor further configured to alert the user or a system administrator if one or more of the web resources in the set of web resources has been compromised.

BRIEF DESCRIPTION OF THE FIGURES

Exemplary embodiments of the invention are described herein with reference to the accompanying drawings, in which.

DESCRIPTION

The inventors have appreciated that, to stay up to date on the integrity of web resources, an everyday computer user must continually check various news sources so that they can be aware of security breaches relating to web resources they wish to use. This can make it difficult for users to react quickly to a compromise of a web resource.

Typically, Internet security applications are based on a database of web resources that places various web resources into different categories, such as malware, pornography or clean. "Clean" sites encompass those that are believed by known web security systems to pose no risk to a user's system or data and are therefore considered trusted. Recently, attackers have attempted to compromise clean sites so that they may circumvent web security applications with malicious intent. The inventors have appreciated that current web security applications are unable to detect such attacks.

Generally, disclosed herein are methods and apparatus for allowing an everyday computer user to become aware of the integrity of web resources, for example, which web sites on the Internet have been recently compromised. Exemplary methods and apparatus automatically keep track of the integrity of web resources a user has visited without the need for the user to keep up with various news sources in order to find the information themselves. In particular, exemplary methods and apparatus automatically keep track of whether clean sites have been compromised during a preceding time period.

Exemplary systems disclosed herein are comprised of a client component installed as part of a standard computer security software suite, and a server component used to provide the client with relevant information on the integrity of web resources. This is discussed in greater detail below.

Figure 1:
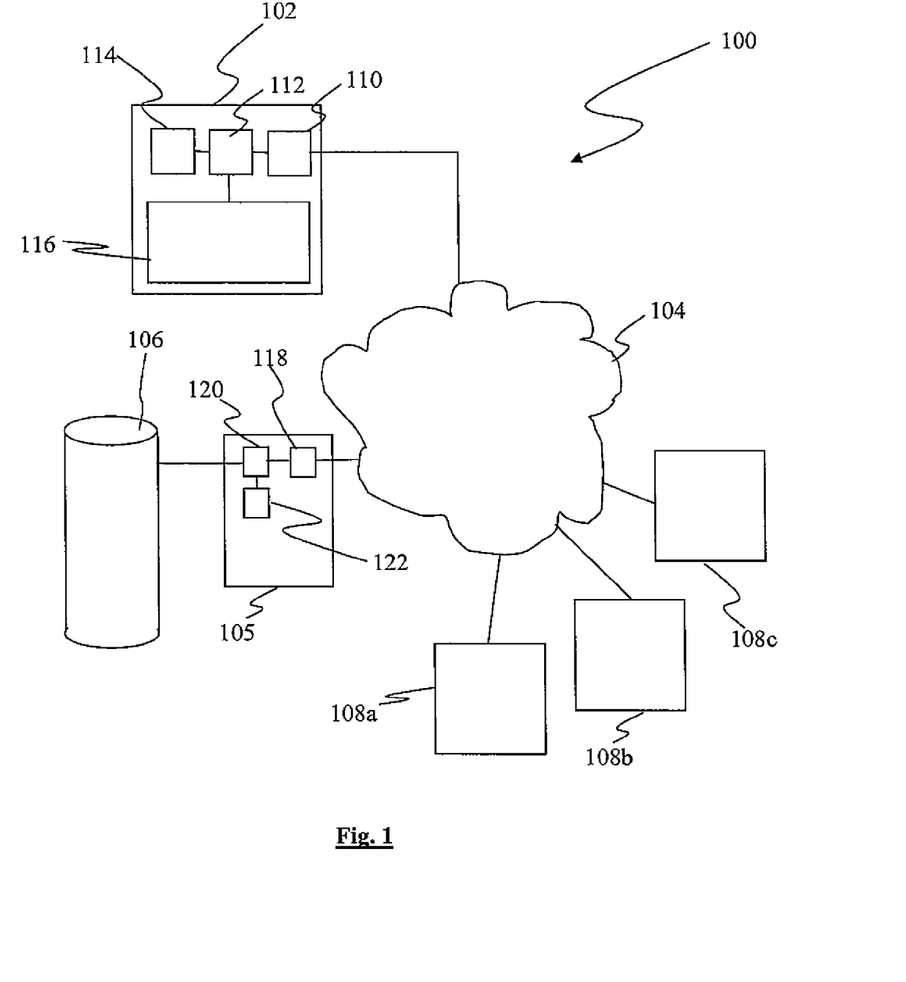
FIG. 1 is a schematic representation of a system for determining whether a web resource has been compromised.

FIG. 1 shows a system 100 for determining whether one or more web resources has been compromised. The system 100 shown in FIG. 1 may be configured to carry out all or part of any of the methods disclosed. It is noted that the term "web resources" encompasses any entity, e.g. a file, document or web page, that can be identified, named, addressed or handled, in any way whatsoever, in the Internet or in any networked information system. For example, a web resource may be a target of a Uniform Resource Locator (URL). Commonly, a web resource may be a website.

The system 100 comprises a device 102 in electrical communication with a network 104. The network 104 may comprise the Internet or may be a self contained WAN or LAN. A server 105 is in electrical communication with the network 104. The server 105 is also in electrical communication with a database 106. Further, web resources 108a-c may be accessed via the network 104.

Generally, the client component of the system comprises the device 102, and the server component of the system comprises the server 105 and the database 106.

The device 102 comprises a communication facility or network interface 110. The network interface 110 is configured to send and receive data over the network 104. The device further comprises a processor 112 in electrical communication with the network interface 110. The processor 112 is also in electrical communication with a memory 114 and a user interface 116. The processor 112 is configured to control the network interface 110, the memory 114 and, optionally, the user interface 116 to carry out one or more methods described herein. The processor 112 is also configured to transmit information to the user interface 116 and to receive information from the user interface 116. The user interface 116 may be a screen, touch-screen, keyboard, mouse or the like and is configured to receive information input by a user and/or present information to a user.

The server 105 is configured to receive requests for data (e.g. database queries) from devices via the network 104 and to transmit data retrieved from the database 106 to devices via the network 104. The database 106 is configured to store data relating to the integrity of the web resources 108a-c. The database 106 may comprise a full database system, or may comprise any computer readable memory capable of storing data.

The server 105 comprises a network interface 118 in electrical communication with the network 104. The server 105 further comprises a processor 120 in electrical connection with the network interface 118, a memory 122 and a database 106. The processor 120 is configured to control operation of the memory 122, the network interface 118 and the database 106 to undertake methods described herein.

In exemplary systems 100, the server may be configured to store a browsing history of web resources requested by a user. Further, the processor 120 may be configured to compare a stored browser history against a database comprising entries identifying web resources that have been compromised. If the browsing history comprises a compromised web resource, the processor 120 may be configured to send an alert to a user device.

In exemplary systems, the browsing history may be stored to a cloud service (e.g. to a collection of servers) where it may be stored for a long period of time. Therefore, the server may be configured to scan the browsing history from the cloud service when a new compromised web resource is identified. If the scan reveals that a user has requested a compromised web resource, an alert is presented to the user. Alternatively, a scan of the browsing history may be undertaken by the server when software is first loaded onto a system and, if the browsing history indicates that a user has visited a compromised web resource before the software was loaded, an alert is presented to the user. Alternatively, the server may be configured to scan the browsing history periodically. As the browsing history is stored to a cloud service, it may be scanned whilst the device is offline.

The system 100 may be used to analyse and record information about web resources that have been requested by a user's computer system, for example the device 102. Typically, a web resource is requested using a URL.

The exemplary system 100 of FIG. 1 shows a client-server configuration, wherein the device 102 is a client configured to communicate with the server 105. However, in other exemplary systems, the device 102 and the database 106 may form part of the same device and may communicate with each other without the need for a network.

Exemplary systems comprise a client side component, e.g. the device 102, and a server-side component, e.g. the server 105. The server side component may be a single server, such as the server 105, or may comprise a cloud of networked servers that are configured to provide reputation information about web resources when queried by user devices 102. The client side and server side components may comprise software installed on a relevant processor for obtaining integrity information relating to one or more web resources.

In exemplary systems, the client side component may be formed from two further components: a first component configured to monitor a user's requests for web resources 108a-c from a user's system and to collect statistics about a user's browsing behaviour; and a second component configured to query the server 105 and associated database 106, based on the collected statistics, and to alert a user or system administrator if the security of a web resource has been compromised. The first component may be implemented as a browser plug-in or as a network traffic interception service.

In particular exemplary systems, the first component and the second component may be embodied in computer program code running on the processor 112.

Figure 2:
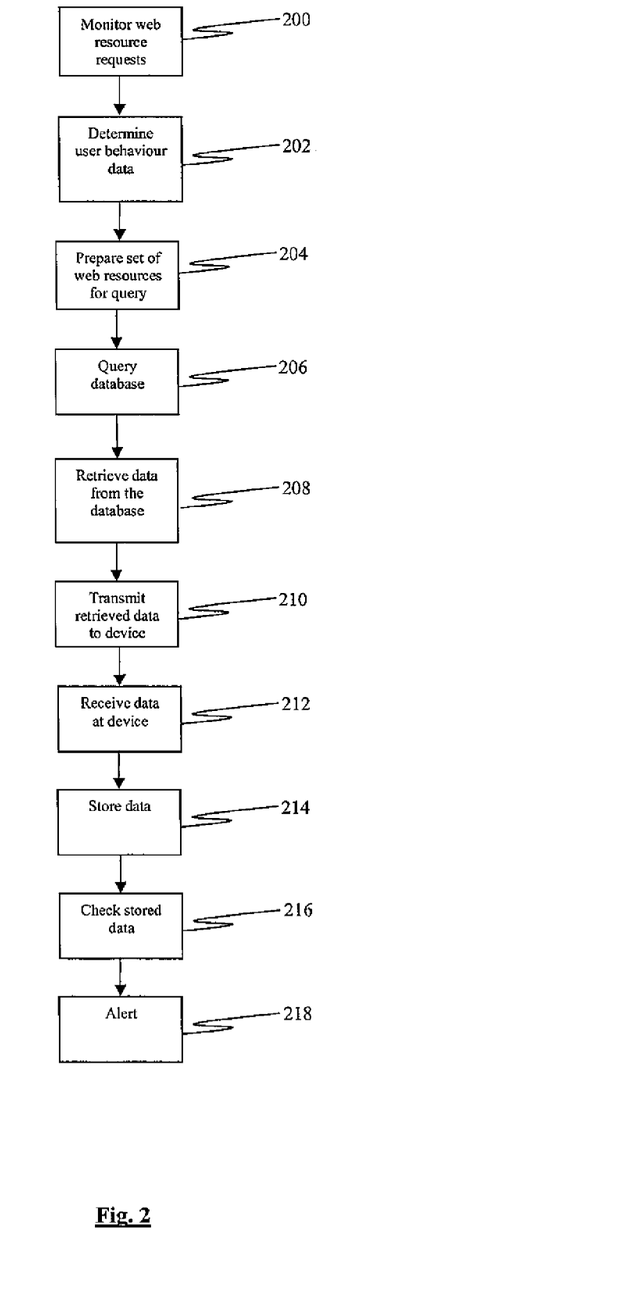
FIG. 2 is a method of determining whether a web resource has been compromised.

FIG. 2 shows a method of determining whether one or more web resources 108a-c has been compromised.

Web resource requests made by a user of the device 102 are monitored 200. From the web resource requests, user behaviour data may be determined 202.

The monitoring of the web resource requests is undertaken by intercepting web requests made by the user. The intercepted request data, which may comprise URL data, is then normalised and parsed. URL normalisation (or URL canonicalisation) is the process by which URLs are modified and standardised in a consistent manner. The goal of the normalisation process is to transform a URL into a normalised or canonical URL so it is possible to determine if two syntactically different URLs may be equivalent. The web resource requests are parsed in order to derive the base domain name of the web resource that has been requested. In exemplary methods and apparatus, the processor 112 of the device 102 is configured to monitor web resource requests made by a user of the device 102. Therefore, the processor 112 may be configured to intercept, normalise and parse the web resource requests. In addition, the processor 112 may be configured to intercept data traffic between the device 102 and a web resource, in particular to determine whether any data has been uploaded to a server associated with a web resource, or whether any communication has occurred between the client and a server associated with a web resource.

In exemplary methods and apparatus, data associated with tracking usage statistics is stored in a database that may be a section of the memory 114 on the device 102. The stored web request data is used to determine a set of web resources that may be based on user browsing behaviour data. The stored data (obtained as part of monitoring a user's requests for web resources) may include, but is not limited to, base domain names of web resources requested, timestamps identifying the time a web resource is requested, an HTTP method used when requesting a web resource and whether the user has uploaded data to a server associated with a requested web resource.

In exemplary methods and apparatus, monitoring user requests for web resources may be undertaken over a period of time of one or more days to determine a set of web resources used and trusted by the user. In specific exemplary methods and apparatus, monitoring user requests for web resources may be undertaken for two weeks or longer. In other exemplary methods and apparatus, monitoring user requests for web resources may be undertaken for one calendar month.

For the avoidance of doubt, the term "trusted" as used herein encompasses web resources that a user would not normally consider to be malicious or a risk to their computer system and/or personal data. For example, web resources may be categorised as malware or as containing adult material and such web resources may not be considered trusted web resources by a user. However, web resources may be categorised as "clean" and such web resources may be considered trusted. Clean web resources may be categorised as such by known web security applications. Trusted web resources may be determined as those that a user accesses commonly or which a user considers to be safe, such as certain social media sites, banking sites and email account sites. A web resource may be considered trusted based on one or more of the frequency of user requests for the resource, whether a user has requested the web resource recently and whether a user has uploaded any personal data to the web resource. A web resource may further be considered trusted based on the category of the web resource, e.g. if it is not malware or pornography.

The inventors have appreciated that, if a trusted web resource that normally poses no risk to a user or the user's system is compromised, this may represent a security risk to the user. Specifically, if a trusted web resource has been compromised at some time in the past and the compromise has subsequently been fixed, there may be no indication available to the user that the compromise even occurred and the user may be at risk from the compromise with no knowledge of it. The database is therefore configured to store past data on whether a web resource has been compromised within a preceding time period, as explained below.

From the stored data, the processor 112 is configured to determine a set of web resources used and trusted by the user. The set of web resources may be determined from user behaviour data obtained as part of a process of monitoring a user's requests for web resources. Determining the user behaviour data may comprise determining whether a user is a frequent visitor of a web resource. Alternatively or in addition, determining the user behaviour data may comprise determining whether a user has visited a web resource recently. Alternatively or in addition, determining the user behaviour data may comprise determining whether a user has submitted data to a server of a web resource or whether the user has an account with a provider of the web resource. By monitoring the user's web resource requests in this way, the set of web resources is targeted to those web resources that are of interest to the user. The set may therefore be a reduced set compared to the total number of web resources requested by a user over the period of time during which user requests are monitored. Further, the set comprises web resources that are trusted by the user because the user has requested them frequently or recently or has uploaded data to them. In exemplary methods and apparatus, the data uploaded to a server associated with a web resource may comprise personal data, for example, login details, password details, credit card details or any other personal data that a user wishes to remain secure.

In determining whether a user is a frequent user of a web resource, the processor may be configured to determine how many requests for a given web resource a user has made within a specified time period. That is, if a user has made a request for a web resource more than a specified number of times within the specified time period, the user may be determined to be a frequent user of the web resource. Specific exemplary methods and apparatus may determine the number of days on which a user requests a web resource within a specified number of days and, based on that, determine whether a user is a frequent user of a web resource. For example, if a user requests a web resource on 10 or more days within a one calendar month (for example, 30 day) period, the user may be determined to be a frequent user of the web resource.

In determining whether a user has requested a resource recently, the processor 112 may be configured to determine when was the last time a user requested a web resource. If the last request for a web resource falls within a specified time period immediately preceding a time at which user behaviour data is determined, the user is considered to be a recent requester of the web resource. For example, if a user has requested a web resource within the last 14 days, they may be determined to have requested the web resource recently.

Exemplary methods and apparatus may therefore log, for the purposes of tracking user activity, whether a user has requested a web resource on a given day and not the number of times a user has requested a web resource within the given day.

In exemplary methods and apparatus, the monitoring of user web resource requests and the determination of the user behaviour data may be undertaken by the first component of the client side.

A set of web resources 108a-c about which integrity information is required is determined 204 based on the monitoring of a user's requests for web resources. The set may be prepared by the processor 112 of the device 102 by reading information from the determined user behaviour data. The processor 112 then assembles a set of web resources about which to query the database.

The set may comprise one or more of: web resources of which a user is determined to be a frequent requestor; web resources 108a-c that a user has requested recently; and web resources to which a user has uploaded data.

The processor 112 then queries 206 the database 106. This may be done by transmitting a database query to the server 105 via the network 104. The server 105 receives the query at the network interface 118. The query is passed to the processor 122 of the server 105, which processes the query and communicates with the database 106 to retrieve 208 the requested information relating to the integrity of the web resources 108a-c in the set.

The database is configured to store past data relating to whether a web resource has been compromised. In particular, the database may be configured to store data relating to whether a trusted web resource has been compromised. The database is able to return historical data relating to whether a web resource has been compromised during a specified preceding time period irrespective of whether the compromise has since been fixed. In specific exemplary methods and apparatus, the database may return data relating to whether a web resource has been compromised during the last 14 days or more. In other specific exemplary methods and apparatus, the database may return data relating to whether a web resource has been compromised during the last calendar month (e.g. 30 days) or more. In other specific exemplary methods and apparatus, the database may return data relating to whether a web resource has been compromised during a range from the last 14 to 30 days. In other exemplary methods and devices, the database may return data relating to whether a web resource has been compromised during the one month or longer.

The retrieved information may contain information relating to none, one or a plurality of the web resources 108a-c on the query list. If none of the queried web resources has been compromised recently, then no data is retrieved from the database 106. Therefore, if no data is retrieved then this may indicate that the queried web resources have not been compromised. If one or more queried web resources is known to have been compromised, such information will be retrieved from the database 106. In some exemplary methods and apparatus, the retrieved data also includes meta data relevant to the compromise itself. Such meta-data might comprise details about one or more of whether account names, passwords or credit card numbers were compromised when the web resource was compromised and a time of when the compromise occurred.

The server 105 then transmits 210 via the network 104 the retrieved data to the device 102. If no data is retrieved from the database 106 then a suitable message may be transmitted to the device 102 to indicate that or, alternatively, no message may be transmitted.

The device 102 receives 212 the transmitted data. The device 102 may be configured to store the received data at the memory 114. Further, if one or more of the queried web resources is identified as being compromised, the processor 112 of the device 102 may generate 214 an alert to notify the user. The alert may be scheduled to be generated at the next available opportunity. For example, the alert may be scheduled to occur at the next time when processing capacity is available. The alert may be generated immediately that the data identifying a compromise to a web resource is received.

Alternatively or in addition, the alert may be generated at a later time, for example, when a user next requests a web resource that is identified as being compromised. In such exemplary methods and apparatus, the processor 112 is configured such that, when a user requests a web resource, data stored at the memory 114 relating to whether the web resource has been compromised is checked 216. If the stored data indicates that the web resource has been compromised, the processor is configured to restrict access to the web resource and/or to alert the user and/or a system administrator 218.

The alert may be notified to the user and/or the system administrator by way of the user interface 116. The alert may contain details about when a compromise happened, as well as hints to the user about what they may do to protect themselves and/or their personal information. For example, the alert may warn the user to change their password or contact their bank about possible theft of their credit card number. Such an alert may take multiple forms. For example, it would be possible to alert a user via an on-screen pop-up, an email message or other types of messages.

In exemplary methods and apparatus, the device 102 is configured to store on the memory 114 the data retrieved from the server 105 following a database query. In such exemplary methods and apparatus, the data received from the server 105 may be used to update the data held in the memory 114, as necessary. In this way, the device 102 may be configured to hold a record of the most recent integrity information relating to the web resources 108a-c.

In exemplary methods and apparatus, the device 102 may be configured to send a database query periodically over the network 104 to a server 105. The data received from the server 105 following such a periodic query may be used to alert the user and/or to update information stored at the memory 114 relating to the integrity of web resources 108a-c. This allows the device 102 to maintain an up to date record of information relating to the integrity of web resources.

It is noted that the term "periodically query" as used herein encompasses a plurality of database queries temporally spaced. Periodic queries may have uniform temporal spacing. In certain cases, database queries may be scheduled to occur at regular time intervals. In certain cases, even though database queries are scheduled to occur at regular time intervals, the processor may be busy on a particular task that must be completed before the next database query occurs, or the device 102 may be switched off. In such cases, the next database query may occur at the next available opportunity. In exemplary methods and systems, the database may be queried daily.

Alternatively or in addition, queries may be triggered by a user instigated event. For example, when a user requests a web resource, the device 102 may be configured to send a database query relating to the requested web resource. Therefore, the device 102 may be configured to provide the most current data available relating to the web resource 108a-c requested by a user.

The server 105 may be configured to update the data contained on a database 106. The update may be undertaken periodically so as to keep the data held on the database 106 current. There are several public sources available to provide information relating to the integrity (e.g. whether a compromise has occurred) of web resources. These sources may comprise news sources and social media activity. Some of the work in collating the information may be undertaken manually by analysts. Other sources may comprise CERT organisations, law enforcement agencies and hacker news sites. Exemplary sources include http://www.zone-h.org/ and http://pwnedlist.com/. The server 105 may therefore be configured to request data from these sources at regular intervals in order to update the database 106.

The workflow required to keep the database updated may involve configuring the database to track web resource compromises. The workflow may follow a standard workflow used in web resource threat research and monitoring practice. The database itself may contain fields to track one or more of URL information, dates of when a compromise happened and when it was fixed, information about the compromise (for example, textual information) and flags indicating the sort of compromise (for example, stolen credentials, site server exploitation etc.). In exemplary embodiments, analysts may be assigned to update the database by monitoring news, social media and performing web searches on a daily basis. Such activities may be undertaken automatically by a computer device. Information arising from such activities may be either automatically added to the database or checked by an analyst and entered into the database if valid.

Computer devices may be configured to take care of keeping information on the database up to date and removing old unneeded entries. The volume of data in a database used to track compromised web resources would likely not be high (compared to, for example, keeping a database of reputations and classifications of URLs). Therefore, it is likely that maintenance of the database disclosed herein and pruning old entries may be done either automatically or manually without a large burden. The flow may be: 1) gather data about newly compromised sites, 2) review data, 3) update the database (add or modify an entry), 4) periodically prune no longer relevant entries. This workflow may happen on a daily basis.

In exemplary methods and apparatus, a web resource may be determined to have been compromised recently if a compromise has occurred within a specified period of time preceding the time at which a database query is made. In exemplary methods and apparatus, the specified period of time may be in a range from 2 weeks and 6 weeks or, in particular exemplary methods and apparatus, one calendar month. The server 105 may be configured to operate the database 106 to retain information relating to whether a web resource has been compromised for a specific duration of time, after which the data may be deleted from the database 106. In this way, the database 106 may be configured to contain information relating only to web resources that have recently been compromised, as the data is only present in the database 106 if a compromise occurred within the specified period of time. For example, the database 106 may be configured to retain information for a period of time in a range from 2 weeks and 6 weeks or, in particular exemplary methods and apparatus, one calendar month.

Figure 3:
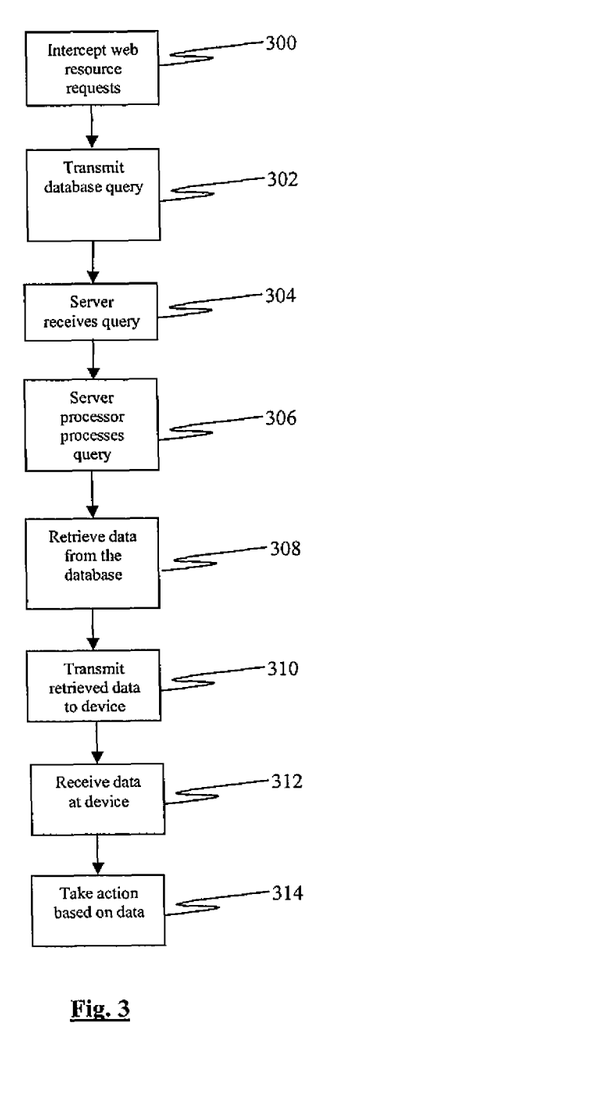
FIG. 3 is a method of determining whether a web resource has been compromised.

FIG. 3 shows a further exemplary method in which the system 100 is used to record and analyse information about web resources 108a-c that are requested by a user's computer device 102.

The processor 112 of the device 102 is configured to intercept 300 requests for web resources 108a-c. The web resource requests may be made from a browser running on the processor 112. Therefore this functionality may be obtained using either a browser plug-in or as part of a network traffic interceptor. The processor 112 is configured to query 302 the database 106 for determining whether the requested web resource 108a-c has been compromised at any time in a specified preceding time period. For example, when a web resource 108a-c is requested by the user from a web browser, the processor 112 is configured to intercept the request and send a database query to the server 105. The database query contains data relating to the web resource 108a-c that has been requested by the client computer device 102.

The query is transmitted to the server 105 via the network 104. The server 105 receives 304 the query. The query is received at the network interface 118 of the server 105 and passed to the processor 120 of the server 105. The processor 120 processes 306 the query. The processor 120 then obtains 308 the requested data from the database 106.

The data is passed from the database 106 to the server 105 and then transmitted 310 to the device 102 via the network 104.

The processor 112 of the device 102 receives 312 the obtained data, which relates to the reputation of the requested web resource 108a-c, from the server 105. The processor 112 takes appropriate action 314 based on the information it has received.

In exemplary methods and apparatus, the data obtained from the database 106 comprises data relating to whether the requested web resource 108a-c has been compromised at any time during a preceding time period. Specifically, the data obtained from the database 106 may comprise data relating to whether the web resource 108a-c has been compromised at any time during the last one or more days. In other exemplary methods and apparatus, the data obtained from the database 106 may comprise data relating to whether the web resource 108a-c has been compromised at any time during the last 14 or more days. In other exemplary methods and apparatus, the data obtained from the database 106 may comprise data relating to whether the web resource 108a-c has been compromised at any time during a range from the last 14 days to the last 30 days.

The data obtained from the database 106 may give an indication of whether the web resource has been compromised irrespective of the current compromise status of the web resource. That is, even if the web resource 108a-c currently is not compromised, the data obtained from the database 106 may indicate that the web resource 108a-c has been compromised, although that compromise has now been fixed.

Therefore, the database 106 comprises historical data relating to whether a web resource 108a-c has been compromised during the specified time period. It is noted that the use of past security compromise data obtained from the database 106 provides advantages in that the device 102 is alerted to compromises that have happened in the past but have since been rectified.

If the requested web resource 108a-c is known to have been compromised recently, such information is transmitted to the device 102 in a reply to the database query. In addition, the reply may comprise meta-data relevant to the compromise itself. Such meta-data might include one or more of details about whether account names, passwords or credit card numbers were compromised, as well as details of when the compromise happened.

If the device 102 receives information regarding a recent compromise of a requested web resource, the device 102 may be configured to generate and display a web page that will be shown to the user (referred to herein as a "block page"). The block page may contain details about when the compromise happened, as well as hints to the user about what they should do to protect themselves, their data and/or their devices. For instance, the block page may warn the user to change their password or contact their bank about possible theft of their credit card number, if they have an account on the site. The block page may contain a button allowing the user to proceed to the site.

If no data indicating a recent compromise is received from the database 106 and the server 105, the reputation of the site is determined as "safe". In such circumstances, the device is configured to allow the browser to proceed to the web resource 108a-c. N no block page is shown.

The database 106 comprises data that is updated from time to time and that comprises data relating to compromises to web resources. There are several public sources available to provide this information and the database may be configured to poll these sources to compile the data. The database 106 may keep information about compromises for a specific duration (for example, one month or more) to allow less frequent visitors to a site to be alerted of a past compromise event.

Figure 4:
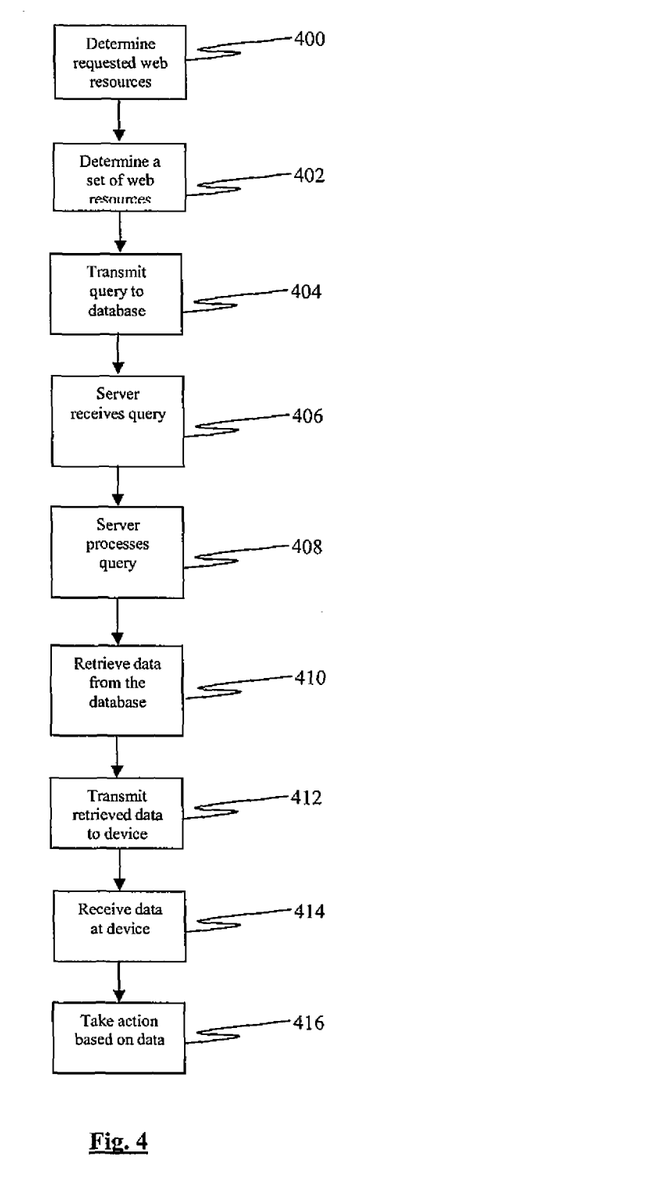
FIG. 4 is a method of determining whether a web resource has been compromised.

FIG. 4 shows a further exemplary method for allowing an everyday computer user to become aware of which web sites that they have visited in the past have been recently compromised. Additionally, the method of FIG. 4 provides advice to the user in the case that they may have suffered a potential loss of credentials or other important information.

The method of FIG. 4 may be of particular benefit when a user first installs a security suite on a device 102, or when using a standalone tool designed for a one-off scan of a device and/or system and the subsequent removal of threats from that device and/or system.

FIG. 4 shows a method of using a system 100 to record and analyse information about web resources 108a-c that have been requested by a user's computer device 102.

At least part of the method may be implemented by a client-side software component that is installed on the processor 112 of a user's local device 102. The at least part of the method may be implemented either as part of an anti-virus security suite or as part of a stand-alone security software tool configured to scan a device 102 in order to detect possible security risks. At least part of the method may be implemented by a server-side component that is either a single server 105 or part of a cloud of networked servers. The server side component is configured to provide reputation information about web resources 108a-c when queried by a user's device 102.

The processor 112 of the device 102 is configured to determine web resources 108a-c requested during a past time period and to query the server 105 for reputation information based on the determined web resources 108a-c. The processor 112 of the device may additionally provide a display to the user via the user interface 116. The display may inform the user about possible compromised sites that the user has visited in the past and additionally provide advice about steps the user should take in order to protect themselves, their data and/or the device 102.

The method of FIG. 4 may be run upon first installation of an anti-virus security suite. Alternatively or in addition, the method of FIG. 4 may be run at any time at the request of the user. Alternatively or in addition, the method of FIG. 4 may be run by the device 102 at a scheduled time or following a triggering event. Alternatively or in addition, the method of FIG. 4 may be undertaken by a standalone software tool as part of the one-time execution of the tool.

The processor 112 is configured to obtain data 400 relating to the web resources requested from the device 102 during a past time period. The data may be obtained by querying browsing history data that is recorded by a web browser installed on the device 102. The data obtained from the browser history data may be used to determine 402 a set of web resources that have been recently requested, or are frequently requested using the browser. The set may be determined as described above in relation to the method of FIG. 2. The processor may be configured to query data from a number of browsers provided by a number of manufacturers (e.g. Firefox, Internet Explorer and Chrome).

Each web resource 108a-c in the set obtained from the browser history is normalised and parsed in order to form a set of base domains of web resources 108a-c. A database query is transmitted 404 to the server 105 for obtaining data related to whether one or more of the web resources 108a-c in the set of web resources has been compromised.

Once the set of base domain web resources has been obtained, the processor 112 transmits 404 the query comprising data relating to the set of base domain web resources 108a-c. The query is transmitted to the server 105 via the network interface 110 and the network 104. The processor 112 is configured to wait for a reply from the server 105 containing the requested reputation data.

The server 105 receives 406 the database query at the network interface 118. The query is processed 408 by the processor 120, which then obtains 410 the requested data from the database 106.

In exemplary methods and apparatus, the data obtained from the database 106 comprises data relating to whether the requested web resource 108a-c has been compromised at any time during a preceding time period. Specifically, the data obtained from the database 106 may comprise data relating to whether the web resource 108a-c has been compromised at any time during the last one or more days. In other exemplary methods and apparatus, the data obtained from the database 106 may comprise data relating to whether the web resource 108a-c has been compromised at any time during the last 14 or more days. In other exemplary methods and apparatus, the data obtained from the database 106 may comprise data relating to whether the web resource 108a-c has been compromised at any time during a range from the last 14 days to the last 30 days.

The data obtained from the database 106 may give an indication of whether the web resource has been compromised irrespective of the current compromise status of the web resource. That is, even if the web resource 108a-c currently is not compromised, the data obtained from the database 106 may indicate that the web resource 108a-c has been compromised, although that compromise has now been fixed.

Therefore, the database 106 may comprise historical data relating to whether a web resource 108a-c has been compromised during the specified time period. It is noted that the use of past security compromise data obtained from the database 106 provides advantages in that the device 102 is alerted to compromises that have happened in the past but have since been rectified.

The processor 120 is configured to transmit 412 the obtained data to the device 102 via the network interface 118 and the network 104. Obtained data may comprise data relating to none, one, or more of the queried set of web resources 108a-c. If none of the web resources 108a-c in the set has been compromised in a specified preceding time period, then no data is passed from the database 106 to the processor 120 of the server 105.

If data is transmitted from the server 105 to the device 102, it may comprise web resources that have been compromised during a specified preceding time period. The obtained data may comprise the URL of the web resource that has recently been compromised. The obtained data may further comprise meta-data regarding the compromise. The meta-data may comprise one or more of the date and time of the compromise and details about whether names, passwords or credit card information were compromised.

The processor 112 is configured to receive 414 the obtained data via the network interface 110 and to take appropriate action 416. If the processor 112 receives data identifying that one or more web resources 108a-c from the set of web resources 108a-c has been compromised, the processor 112 may generate an alert to the user. The alert may be conveyed via the user interface 116. The alert may comprise one or more of a list of which web resources have recently been compromised, the times at which the user has visited those sites since the compromise happened, a description the details of the compromise and advice on what the user should do to protect themselves, their data and/or the device 102. For example, if usernames and passwords were compromised, the user may be instructed to change their password. As a further example, if credit card information was compromised, the user may be recommended to contact their bank. If the processor 112 receives no data identifying that one or more web resources 108a-c from the set of web resources 108a-c has been compromised, the processor 112 may be configured to notify the user accordingly. The notification may be conveyed via the user interface 116.

The database 106 comprises data that is updated from time to time and that comprises data relating to compromises to web resources. There are several public sources available to provide this information and the database may be configured to poll these sources to compile the data. The database 106 may keep information about compromises for a specific duration (for example, one month or more) to allow less frequent visitors to a site to be alerted of a past compromise event.

Each feature of any of the methods and apparatus disclosed herein may be implemented, either alone or in any appropriate combination with any other feature, in any other of the methods and apparatus disclosed herein.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A method of protecting a user from a compromised web resource, the method comprising:
    monitoring, by a processor of a user device, a user's requests for web resources made by the user device over a period of time to determine a set of web resources used and trusted by the user, wherein determining the set of web resources used and trusted by the user comprises adding a web resource to the set of web resources if a frequency of the user's requests for the web resource is greater than a predetermined threshold;
    querying, by the processor, a database based on the determined set of web resources to obtain historical data relating to whether any of the set of web resources has been compromised at any time during a preceding time period; and
    restricting, by the processor, the user's access to a requested web resource of the determined set of web resources if the requested web resource has been compromised,
    wherein the historical data comprises data relating to whether one or more known clean web resources trusted by one or more known web security systems have been compromised.

2. A method according to claim 1, further comprising maintaining the database by polling a plurality of network sources to compile data relating to whether a web resource has been compromised at any time during a preceding time period.

3. A method according to claim 1, wherein reading data from a stored history comprises reading information relating to one or more of: base domain names of a web resource requested; a time that a web resource has been requested; the HTTP method used to request a web resource; and whether the user has uploaded any data to a server associated with a web resource.

4. A method according to claim 1, wherein monitoring the user's requests for web resources further comprises one or more of: determining the number of times the user requests a web resource over a time period; and determining whether the user has requested a web resource within a specified preceding time period.

5. A method according to claim 1, wherein determining the set of web resources further comprises any combination of:
    adding a web resource to the set if the user device has requested the web resource within a specified preceding time period; and
    adding a web resource to the set if the user device has uploaded data to the web resource within a specified preceding time period.

6. A method according to claim 1, wherein the database is queried periodically to obtain data relating to whether one or more of the web resources in the set of web resources has been compromised.

7. A method according to claim 1, wherein monitoring the user's requests for web resources comprises intercepting a request for a web resource, and wherein the one or more web resources to be checked comprises the web resource of the intercepted request.

8. A method according to claim 7, wherein monitoring the user's requests for web resources further comprises normalising and parsing the user request for determining a base domain name for a requested web resource.

9. A method according to claim 1, wherein monitoring the user's requests for web resources comprises storing information relating to one or more of: base domain names of a web resource requested; a time that a web resource has been requested; the HTTP method used to request a web resource; and whether the user has uploaded any data to a server associated with a web resource.

10. A method according to claim 1, wherein the data obtained from the database comprises the identity of a compromised web resource and meta data corresponding to a compromise of the web resource.

11. A method according to claim 10, wherein the meta data comprises one or more of: whether account names were compromised; whether passwords were compromised; whether credit card numbers were compromised; and a time when the compromise occurred.

12. A method according to claim 1, wherein restricting access comprises alerting the user that one or more web resources has been compromised.

13. A method according to claim 12, wherein the alert comprises information of a time at which the compromise occurred and/or a recommended action for the user or a system administrator to take.

14. A method according to claim 1, wherein querying the database comprises checking historical data stored on the database and determining whether a web resource has been compromised, irrespective of the current compromised status of the web resource.

15. A method according to claim 1, the method further comprising storing the data obtained from the database at the user device and if the user requests a web resource, checking the stored data to determine whether the web resource has been compromised.

16. A method according to claim 1, wherein querying the database comprises the processor of the user device transmitting the query to a network database over a network and/or a processor of a server querying a local or a network database.

17. A method according to claim 1, wherein obtaining data relating to whether one or more web resources has been compromised comprises a processor associated with the database transmitting data retrieved from the database in accordance with the query to a user device over a network.

18. A non-transitory computer readable medium comprising computer readable code configured when read by a computer to undertake a method comprising:
    monitoring, by a processor of the computer operated by the user, the user's requests for web resources over a period of time to determine a set of web resources used and trusted by the user, wherein determining the set of web resources used and trusted by the user comprises adding a web resource to the set of web resources if a frequency of the user's requests for the web resource is greater than a predetermined threshold;
    querying, by the processor, a database based on the determined set of web resources to obtain historical data relating to whether any of the set of web resources has been compromised at any time during a preceding time period; and restricting, by the processor, the user's access to a requested web resource of the set of web resources if the requested web resource has been compromised, wherein the historical data comprises data relating to whether one or more known clean web resources trusted by one or more known web security systems have been compromised.

19. A device for protecting a user from a compromised web resource, the device comprising a processor configured to:

monitor a user's requests for web resources over a period of time to determine a set of web resources used and trusted by the user, wherein determining the set of web resources used and trusted by the user comprises adding a web resource to the set of web resources if a frequency of the user's requests for the web resource is greater than a predetermined threshold;

query a database to obtain historical data relating to whether the one one or more web resources of the determined set of web resources has been compromised at any time during a preceding time period; and restrict the user's access to a requested web resource of the determined set of web resources if the requested web resource has been compromised, wherein the historical data comprises data relating to whether one or more known clean web resources trusted by one or more known web security systems have been compromised.

20. A system for protecting a user from a compromised web resource, the system comprising a device processor and a database:

the device processor being configured to:

monitor a user's requests for web resources over a period of time to determine a set of web resources used and trusted by the user, wherein determining the set of web resources used and trusted by the user comprises adding a web resource to the set of web resources if a frequency of the user's requests for the web resource is greater than a predetermined threshold; and query the database to obtain historical data relating to whether one or more web resources of the set of web resources has been compromised at any time during a preceding time period; and the database being configured to:

receive the query and provide data to the processor in accordance with the query;

the device processor being further configured to restrict the user's access to a requested web resource of the set of web resources if the requested web resource has been compromised, wherein the historical data comprises data relating to whether one or more known clean web resources trusted by one or more known web security systems have been compromised.

21. A server for protecting a user from a compromised web resource, the server comprising a device processor configured to:

monitor a user's requests for web resources from a user device over a period of time to determine a set of web resources used and trusted by the user, wherein determining the set of web resources used and trusted by the user comprises adding a web resource to the set of web resources if a frequency of the user's requests for the web resource is greater than a predetermined threshold;

query a database to obtain historical data relating to whether one or more web resources of the set of web resources has been compromised at any time during a preceding time period; and restrict the user's access to a requested web resource of the set of web resources if the requested web resource has been compromised, wherein the historical data comprises data relating to whether one or more known clean web resources trusted by one or more known web security systems have been compromised.

\* \* \* \* \*